US009569725B2

(12) United States Patent
B'Far et al.

(10) Patent No.: US 9,569,725 B2
(45) Date of Patent: Feb. 14, 2017

(54) TECHNIQUES FOR EXTRACTING SEMANTIC DATA STORES

(75) Inventors: Reza B'Far, Huntington Beach, CA (US); Nigel Jacobs, Austin, TX (US); Ryan Golden, Austin, TX (US); Yasin Cengiz, Santa Ana, CA (US); Tsai-Ming Tseng, Santa Ana, CA (US); Uppili Ranga Srinivasan, Irvine, CA (US); Joseph Mazur, Basking Ridge, NJ (US); Alan Waxman, Morganville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 456 days.

(21) Appl. No.: 12/581,804

(22) Filed: Oct. 19, 2009

(65) Prior Publication Data

US 2011/0093469 A1 Apr. 21, 2011

(51) Int. Cl.
*G06F 17/30* (2006.01)
*G06N 5/02* (2006.01)

(52) U.S. Cl.
CPC ......... *G06N 5/022* (2013.01); *G06F 17/30563* (2013.01)

(58) Field of Classification Search
None
See application file for complete search history.

(56) References Cited

U.S. PATENT DOCUMENTS

| 7,308,702 | B1 * | 12/2007 | Thomsen et al. ................. 726/1 |
| 7,752,230 | B2 * | 7/2010 | Bland ............... G06F 17/30563 707/709 |
| 7,792,783 | B2 * | 9/2010 | Friedlander et al. ......... 707/600 |
| 8,756,191 | B2 | 6/2014 | B'Far et al. |
| 2005/0149230 | A1 | 7/2005 | Gupta et al. |
| 2005/0223109 | A1 * | 10/2005 | Mamou ................... G06Q 10/10 709/232 |
| 2007/0011175 | A1 * | 1/2007 | Langseth et al. ............. 707/100 |
| 2007/0124263 | A1 | 5/2007 | Katariya et al. |
| 2007/0239666 | A1 * | 10/2007 | Garcia .............................. 707/2 |
| 2008/0256121 | A1 * | 10/2008 | Liu et al. ...................... 707/102 |
| 2008/0306973 | A1 * | 12/2008 | Richard ........................ 707/100 |
| 2011/0087629 | A1 | 4/2011 | B'far et al. |
| 2011/0093430 | A1 | 4/2011 | B'far et al. |

OTHER PUBLICATIONS

Astrova, et al., "Rule-Based Transformation of SQL Relational Databases to OWL Ontologies," 2nd International Conference on Metadata and Semantics Research, 16pp. (Oct. 2007).
B'Far, et al., "SDR: An Architectural Approach to Distribution of Complex Ontology Processing," *Proc. SWWS*, pp. 10-18 (2009).

(Continued)

*Primary Examiner* — Miranda Huang
(74) *Attorney, Agent, or Firm* — Kilpatrick Townsend and Stockton LLP

(57) ABSTRACT

Techniques for enforcing policies. A set of data is stored in one or more data stores. A plurality of semantic concepts for an ontology are defined and a map is constructed from the set of data to the concepts. The map is executed in order to transform data from the set of data to a second set of data. The second set of data is stored according to the ontology. The second set of data is reasoned in order to determine compliance with one or more policies.

18 Claims, 5 Drawing Sheets

(56) References Cited

OTHER PUBLICATIONS

Calvanese, et al., "Tailoring OWL for Data Intensive Ontologies," *Proceedings of the OWL: Experiences and Directions Workshop,* 10pp. (2005).
Codd, E. F., "A Relational Model of Data for Large Shared Data Banks," *Communications of the ACM,* vol. 13, No. 6, pp. 377-387 (Jun. 1970).
Dean, Jeffery and Sanjay Ghemawat, "MapReduce: Simplified Data Processing on Large Clusters," Sixth Symposium on Operating Systems Design and Implementation, 15 pp. (2004).
Dean, Mike and Guus Schreiber, eds., "Web Ontology Language Reference," WC3 Recommendation, http://www.w3.org/TR/owl-ref/, 55pp. (Feb. 10, 2004).
Oxford English Dictionary, "Definition of 'Semantic'," Oxford English Dictionary Online, http://oxforddictionaries.com/definition/semantic, 1 pp. (Jun. 9, 2011).
Park, et al, "An Efficient and Scalable Management of Ontology," Proceedings of the 12th —International Conference of Database Systems for Advanced Applications, *Lecture Notes on Computer Sciences,* vol. 4443, pp. 975-980 (Apr. 2007).
Reiter, R., "On Closed World Data Bases," in *Logic and Data Bases,* Gallaire & Minker, eds., pp. 55-76, Plenum Press: New York (1978).
Sequeda et al, "A Bootstrapping Architecture for Integration of Relational Databases to the Semantic Web," *Proceedings of the Poster and Demonstration Session at the 7th International Semantic Web Conference* (ISWC), 2 pp. (2008).
Shen, et al., "Research on Rules of Mapping from Relational Model to OWL," *Proceedings of OWLED '06,* 9pp. Athens, Georgia (Nov. 2006).
Sonia, Kiran and Sharifullah Khan, "R2o Transformation System: Relation to Ontology Transformation for Scalable Data Integration," *Proceedings of the 2008 International Symposium on Database Engineering* (2008).
Tirmizi et al, "Translating Sql Applications to the Semantic Web," *Proceedings of the 19th International Conference on Database and Expert Systems Applications,* 2pp. (2008).
Saad, Yousef. *Iterative Methods for Sparse Linear Systems.* [online]. 2000 [retrieved on Nov. 26, 2012]. Retrieved from the Internet: <URL: http://www.stanford.edu/class/cme324/saad.pdf>.
Clark & Parsia, LLC, "Introducing Pronto: Probabilistic DL Reasoning in Pellet". [online] 2007 [retrieved on Jul. 11, 2012]. Retrieved from the Internet: <URL: http://weblog.clarkparsia.com/2007/09/27/introducing-pronto>.
Friedman-Hill, Ernest, "Jess®: The Rule Engine for the Java™ Platform," Version 7.1p2 [online] 2008 [retrieved on Jul. 11, 2012]. Retrieved from the Internet: <URL: http://www.jessrules.com/jess/docs/Jess71p2.pdf>.
Soma et al., "Parallel Inferencing for OWL Knowledge Bases" [online] 2008 [retrieved on Jun. 14, 2012]. Retrieved from the Internet: <URL: http://halcyon.usc.edu/~pk/prasannawebsite/papers/ram_icpp08.pdf>.
U.S. Appl. No. 12/576,176, Notice of Allowance, Apr. 22, 2013, 12 pages.
U.S. Appl. No. 12/874,821, Notice of Allowance, Jun. 17, 2013, 8 pages.
U.S. Appl. No. 14/019,440 , "Non-Final Office Action", Oct. 25, 2013, 8 pages.
U.S. Appl. No. 14/019,440, "Notice of Allowance," mailed Mar. 26, 2014, 5 pages.
U.S. Appl. No. 12/576,176, Final Office Action mailed on Jan. 16, 2013, 12 Pages.
U.S. Appl. No. 12/576,176, Non-Final Office Action mailed on Jun. 27, 2012, 15 Pages.
U.S. Appl. No. 12/874,821, Non-Final Office Action mailed on Oct. 11, 2012, 9 Pages.
Soma, et al., A Data Partitioning Approach for Parallelizing Rule Based Inferencing for Materialized OWL Knowledge Bases [online]. University of Southern California, 2008 [retrieved on Jan. 9, 2013]. Retrieved from the Internet: <URL:http://pgroup.usc.edu/pgroupW/images/4/4a/Paper_2008_6.pdf>.

* cited by examiner

TECHNIQUES FOR EXTRACTING SEMANTIC DATA STORES

CROSS REFERENCE TO RELATED APPLICATIONS

This application incorporates by reference for all purposes co-pending U.S. patent application Ser. No. 12/576,176 filed on Oct. 8, 2009, entitled "Techniques for Processing Ontologies."

BACKGROUND OF THE INVENTION

Many business applications, such as Enterprise Resource Planning (ERP) applications, generate and manage large amounts of business transaction data which are stored in many different formats (e.g. RDBMs, LDAP directories, flat files, etc.), and which use a plethora of different schema or data models.

In addition, governance, risk, and compliance (GRC) concerns often lead businesses to have internal business policies intended to address a wide range of issues such as security, privacy, trade secrets, criminal activity of employees or others with access to the business, and many others. These business policies address various aspects of a business, such as purchasing, selling, marketing, and internal administration. Because of the large number of activities occurring during the course of running a business, which may have various entities located in a variety of geographical locations, it is often impractical to manually monitor all activities in which improper behavior or mistakes may occur. Thus, GRC concerns often require that dynamic, legislative, and trend-driven policies be enforced against business transaction data which may span multiple business applications and, therefore, potentially a set of disparate, yet related, data sources.

Moreover, users of business applications typically prefer to interact with applications that assist in policy enforcement using relevant business semantics as opposed to application-specific or storage-specific semantics.

On approach to monitoring and controlling a business' computer systems involves storing business data in one or more ontologies. With the advent of semantic technologies, the importance of ontologies and semantic query languages has grown manifold. An ontology is a formal representation of knowledge, specifically a formal representation of a set of concepts within a domain and relationships between the concepts. Ontologies are used in several different areas including business analytics, enterprise systems, artificial intelligence and the like, and have and the potential to be used in several other fields and applications.

An ontology is typically encoded using an ontology language. Several ontology languages are available. The OWL Web Ontology Language has become the industry standard for representing web ontologies. OWL can be used to explicitly represent the meaning of terms in vocabularies and the relationships between the terms. OWL thus provides facilities for expressing meaning and semantics that goes far beyond the capabilities of languages such as XML. OWL is being developed by the Web Ontology Working Group as part of the W3C Semantic Web Activity.

An ontology may be persisted in memory such as in a database or other data store. There are several standard ways of querying and manipulating the data in an ontology using query languages such as RDQL (Resource Description Format Query Language), OWL-QL, SPARQL (SPARQL Protocol and RDF Query Language), and others. Among the ontology query languages, SPARQL is considered by many to be the de facto industry standard.

In the context of a business, data from one or more data stores may be periodically compiled in an ontology, such as in a batch process occurring at times when there is less use of the business' computer systems, such as at night when most employees are not present. Once compiled in an ontology, an ontology reasoner can be used to make logical inferences from the ontology. Generally, an ontology reasoner is a module implemented in hardware or software executed by a processor, configured to infer logical consequences from a set of facts or axioms stored in an ontology. This process is often referred to as "reasoning." Data from an ontology may be converted into a form convenient for processing by the reasoner, such as in a manner described in co-pending U.S. patent application Ser. No. 12/576,176, entitled "Techniques for Processing Ontologies," filed on Oct. 8, 2009, and which is incorporated herein by reference for all purposes. Ontology reasoners are also known as reasoning engines, rules engines, or simply reasoners. Examples include RETE-based rules engines such as JESS, a rules engine for the Java platform, and probabilistic description logic reasoners such as Pronto, available from Clark & Parsia LLC, located at 926 N St. NW Rear, Studio #1, Washington, DC 20001. Ontology reasoners typically incorporate algorithms that, if possible, avoid analyzing complete data sets, and instead analyze only relevant data.

Traditional approaches to business policy enforcement have several shortcomings. For instance, typically business applications create and store very large amounts of data to satisfy various needs of the business. The physical and logical data stores for these applications are typically designed by and organized for use by technical users, not for business users. For instance, types and degree of normalization in Relational Database Management Systems (RDBMSs) are tuned for functionality and performance as opposed to ease of semantic understanding by business users. Thus, the applications operate and store data using terminology that is often meaningless to business analysts. Performing policy analysis using transactional data may involve, for instance, using Structured Query Language (SQL), which is verbose and overly complex for typical business users and whose complexity grows as the complexity of the analysis grows. In addition, with RDBMSs, certain types of queries, such as those containing sliding time-windows, are difficult to accommodate. Complicating matters, each business application may store data differently, often for convenience for each application.

As another example, many business applications hold mission critical data and, therefore, do not expose transactional data, but use datamarts for external analysis to avoid performance loss. This and other data are constantly updated by business systems, making snap-shot techniques difficult to perform and potentially inconsistent in the resulting analysis.

BRIEF SUMMARY OF THE INVENTION

Embodiments of the present invention include techniques for enforcing policies. In accordance with an embodiment, a method for enforcing policies includes storing a first set of data in at least one first data store, defining a plurality of semantic concepts of an ontology, constructing a map from the first set of data to the semantic concepts, executing the map to form a second set of data according to the ontology, and reasoning the ontology to determine compliance with one or more policies.

The at least one first data store may comprise a plurality of data stores and the method may include reformatting at least a portion of the first set of data. For example, the at least one first data store may include a relational database that has at least one table and the method may include denormalizing the at least one table. In addition, executing the map may include filtering the first set of data in order to restrain the size of the second set of data. The method may, for example, include defining a set of ETL transformations from the first set of data to the second set of data. A trigger may be defined and the map may be executed when the conditions for the trigger are fulfilled. Executing the map may include transforming the second set of data into another format, such as format optimized for use by a reasoning engine.

In accordance with another embodiment, at least one computer readable medium, having stored collectively thereon instructions for causing at least one processor to perform a method of enforcing policies is disclosed. The instructions include instructions for storing a first set of data in at least one first data store, for defining a plurality of semantic concepts for an ontology, for constructing a map from said data to said semantic concepts, for executing said map to transform said first set of data into a second set of data, for storing said second set of data in a second data store according to said ontology, and for reasoning said second set of data to determine compliance with one or more policies.

The at least one first data store may comprise a plurality of data stores and the instructions for executing the map may include instructions for reformatting at least a portion of said first set of data. For example, the at lest one first data store may include a relational database that includes at least one table and the instructions may include instructions for denormalizing the at least one table. Further, the instructions for executing may include instructions for filtering the first set of data in order to restrain the size of the second set of data. The instructions for constructing the map may include instructions for defining ETL transformations from the first set of data to the second set of data. The instructions may also include instructions for reformatting the second set of data into another format. Also, instructions for defining conditions for a trigger and executing the map every time the conditions for the trigger are fulfilled may be included.

In accordance with yet another embodiment, a system for enforcing policies is included. The system includes at least one first data store, a processor, a second data store communicatively coupled to the processor, and a rules engine. The first data store is operable to store a first set of data. The processor is operable to extract a second set of data from said first set of data according to a map between said first set of data and set of semantic concepts of an ontology. The second data store is communicatively coupled to the processor and is operable to receive the second set of data according to the ontology. The rules engine is communicatively coupled to the second data store and is operable to reason said second set of data to determine compliance with one or more policies.

In an embodiment, the at least one first data store comprises a plurality of data stores and the processor is operable to reformat at least a portion of the first set of data. For example, the at least one first data store may include a relational database that includes at least one table and the processor may be operable to denormalize the at least one table. The processor may be operable to filter said first set of data and the map may include a set of ETL transformations from the first set of data to the second set of data and may be operable to transform the second set of data into another format.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the business policy domain, and specifically with extracting data to implement business policies. However, the scope of the present invention is not restricted to business policies, but may be applied to other domains or applications. For example, any domain or application where a set of rules or criteria is used to analyze data may make use of the present invention. Examples of domains in which embodiments of the present invention may be used include segregation of duties, separation of powers, transaction monitoring, fraud or other crime detection, semantic web applications, and generally applications dealing with large sets of data.

In general, embodiments of the present invention provide techniques for extracting data. In an embodiment, semantic concepts of an ontology are defined and a map is defined from the data stores to the semantic concepts. Using the map, data is extracted from one or more data stores and loaded into a semantic data store that stores the data according to the ontology. Data may be denormalized during the process of extraction in order optimize the semantic data store for the purposes of policy enforcement. The map may be used to extract data according to one or more triggers in order to ensure that the data in the semantic data store, to the extent possible, reflects the current state of the data from which it was extracted.

Figure 1:
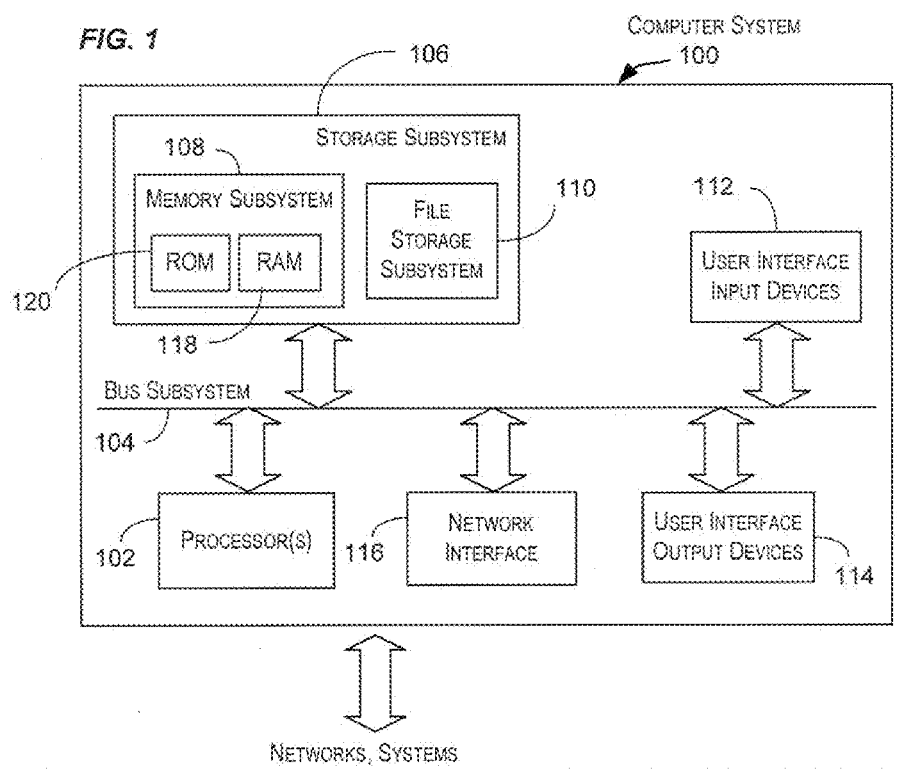
FIG. 1 shows a simplified block diagram of a computer system that may be used to practice an embodiment of the present invention.

Turning now to the drawings, FIG. 1 is a simplified block diagram of a computer system 100 that may be used to practice an embodiment of the present invention. Computer system 100 may serve as a user workstation or server, such as those described in connection with FIG. 2 below. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device in order to execute commands in connection with implementation of specific embodiments of the present invention, such as to implement, define policies, and/or configure various components of an enterprise system, such as that described below in connection with FIG. 2.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Results of implementing policies, defining policies, and configuring various components of a computer system may be output to the user via an output device.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, personal digital assistant (PDA), cellular telephone, a server, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
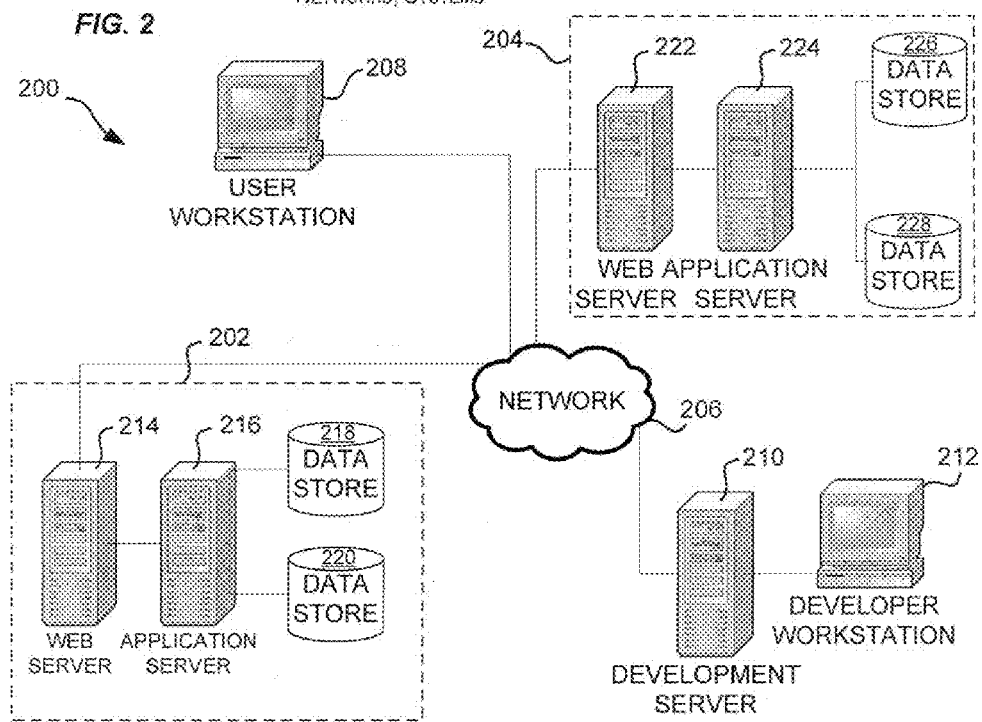
FIG. 2 shows an example of an environment in which embodiments of the present invention may be practiced.

FIG. 2 shows a simplified block diagram of an enterprise computer system 200 that may be used to practice an embodiment of the present invention. It should be understood that, generally, enterprise computer systems vary greatly and, as a result, specific embodiments may include more or less components than shown in the figure and that the specific components shown in FIG. 2 are only intended to provide an example for the purposes of illustration.

In accordance with an embodiment, the enterprise computer system 200 includes a first location 202 and a second location 204 communicatively connected by a network 206, such as the Internet or any suitable communications network or combination of networks. In an embodiment, the first location 202 and second location 204 correspond to separate physical locations of a business, such as offices in two separate cities, states, or countries. While FIG. 2 shows two locations, it should be understood that a business may have only a single location and may include more than two locations. As shown in the drawing, the enterprise computer system 200 may include one or more user workstations 208, a development server 210, and a developer workstation 212. The user workstation 208, development server 210, and/or development workstation 212 may be physically present at any of the locations, or at separate locations. In an embodiment, the user workstation 208 and development server 210 are communicatively connected to the network 206 so as to access various components of the enterprise computer system. For example, the user workstation 208 may include a browser used for viewing content provided from the Internet and/or from other systems within the business. Further, the developer workstation 212 may be connected to the network 206 through the development server 210 and may be adapted to enable certain employees within the organization to configure, install, modify, and perform other actions in connection with the business' computing systems. As an example, a developer within the organization may utilize the developer workstation in order to define policies, execute one or more applications that extract data and store the extracted data in one or more semantic data stores, and that reason the data according to the policies in accordance with various embodiments of the invention. The developer workstation 212 may include one or more rules engines, as may any of the components shown in FIG. 2. Instructions for controlling the applications and the defined policies may be sent over the network 206 to an appropriate computing device executing the one or more applications.

As noted above, the first location 202 may include various computer systems used in operating the business. For example, as depicted in FIG. 2, the first location 202 includes a web server 214 configured to receive requests from various users, such as from a user of the user workstation 208, and to respond to the requests over the network 206. While FIG. 2 shows the web server as a hardware component, as with any of the servers described herein, the web server may also be a software module operating on a computer system. Responses from the web server 214 may be provided from the web server 214 itself or through the web server 214 but from a variety of sources in communication with the web server 214, such as from components of an internal computer system of the first location 202 or from other web servers located at other, possibly third-party, locations.

In an embodiment, the web server 214 is communicably coupled to an application server 216, which is a hardware component or software module configured to run one or more applications, such as one or more policy engines and other applications for managing organizational data. As is known, a user of the user workstation 208 may send a request to the web server 214 that specifies a specific action to be taken in connection with an internal business application implemented on the application server 216. The web server 214 then relays the request to the application server 216 which takes the specified action and returns the result of that action to the web server 214, which in turn relays the result to the user workstation 208. In accordance with an embodiment, the web server 214, or other component, may modify the content returned to the user workstation 208 in accordance with one or more policies applicable to a user of the user workstation 208.

As shown in the example of FIG. 2, the application server 216 interacts with data stored in a first data store 218 and a second data store 220, each of which may store data relevant to the business' operation, such as in one or more relational or other databases. While the disclosed example shows the first location 202 having two data stores, it should be understood that the first location 202 may have less than two data stores or more than two data stores. Information in the data stores can include a wide variety of data, such as data relating to business transactions, invoices, human resources data, user account data, receipts, bank account data, accounting data, payroll data, and generally, any data relevant to the operation of a particular business. Information from the data stores 218, 220, and other sources, may be extracted from the data stores and stored in a semantic data store in accordance with an embodiment of the present invention.

In an embodiment, the second location includes its own web server 222, application server 224, first data store 226, and second data store 224 which may be configured to function similarly to the identically named components above.

Figure 3:
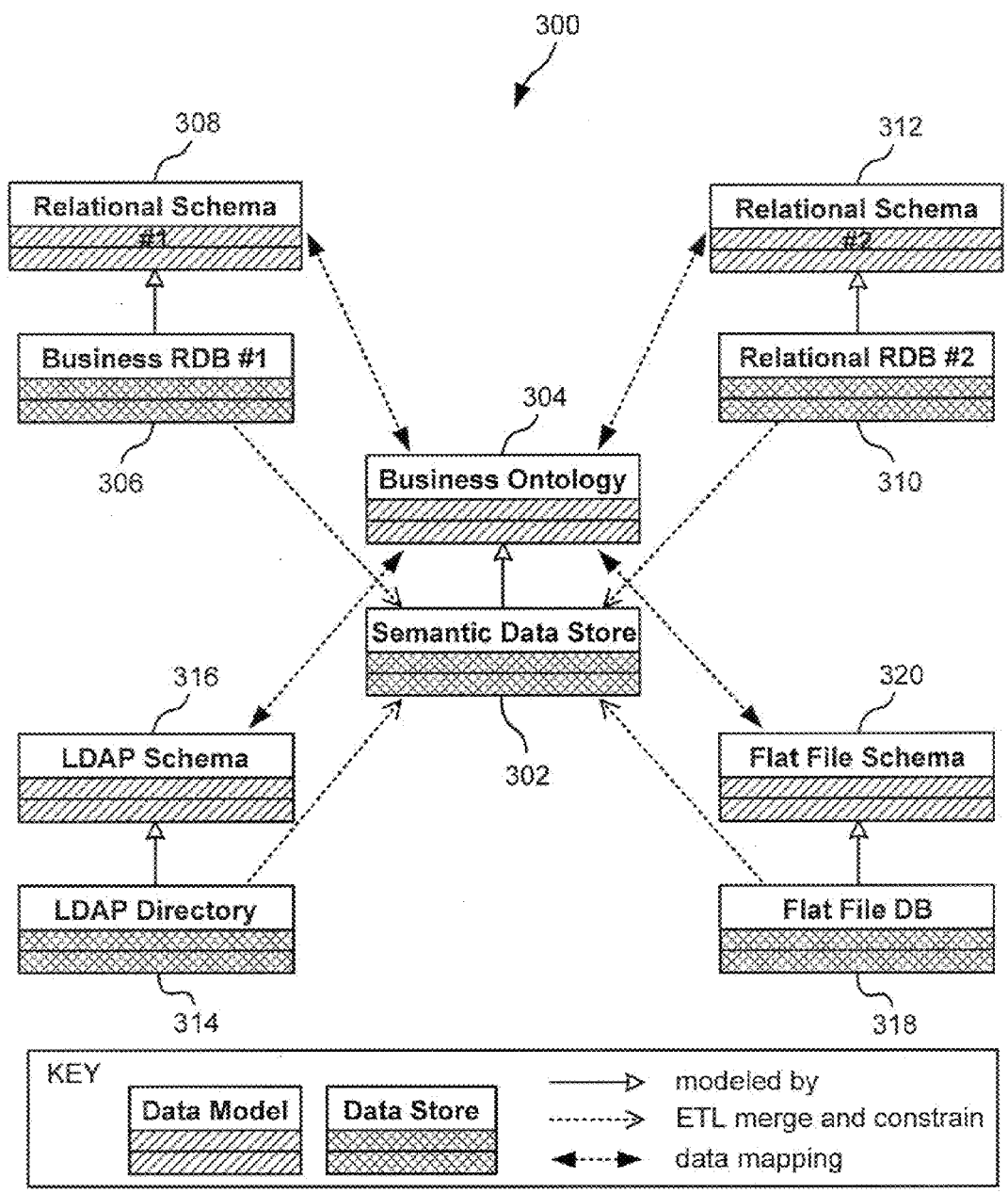
FIG. 3 shows a diagrammatic representation of a logical architecture of a semantic data store, in accordance with an embodiment.

FIG. 3 shows a general representation of an architecture for extracting semantic data from various sources in accordance with an embodiment. The architecture 300, in an embodiment, includes a semantic data store 302 which is modeled by a business ontology 304 according to declarative data mappings, as described in more detail below. Generally, in an embodiment, the business ontology 304 is a representation of semantic concepts from the semantic data store 302 and the relationships between those concepts. Also, in an embodiment, the semantic data store 302 may be realized using the W3C OWL-DL ontology language. It should be understood that, while the present disclosure refers to various concepts within a business domain, the present invention is applicable to any domain that is associated with one or more organizations that store data as part of their operations. Therefore, while the following description refers to a business, the present invention may be applicable to any organization.

In the example of FIG. 3, four different data sources of a business are shown, although a business or other entity may use more than four data sources or less than four. Also, the four different data sources may be physically realized in separate data stores, which may be in separate geographical locations, or two or more data sources may be incorporated into a single data store. As shown in the example demonstrated in FIG. 3, a business may include a first relational database 306 which is modeled by a first relational schema 308. As it applies to data storage, a schema is a structure configured to organize the data of one or more data sources. For example, in a relational database, a schema that models the relational database defines the tables of the database, the fields of each table, and the relationships between the fields and tables.

In the provided example, the business may also include a second relational database 310 which is modeled by a second relational schema 312. There can be various reasons for having more than one source of business data, for example for storing data for different aspects of a businesses' activities, such as sales and human resources. Businesses may also store data in different forms depending on the particular application. For example, in FIG. 3 a light weight directory access protocol (LDAP) directory 314 is modeled by a LDAP schema 316. Likewise, a flat file database 318 may be modeled by a flat file schema 320. Thus, in the example shown in FIG. 3, a business may include data from a variety of sources in a variety of formats.

As can be seen in the figure, data from each of the data sources is mapped to the semantic data store 302. In an embodiment, mapping data from a data source to the semantic data store 302 is described in more detail below, but generally includes extracting data from the source and loading it (or a portion of it) into the semantic data store, which may or may not involve reformatting data from one form to a form suitable for the semantic data store 302. In addition, mapping data from a data source to the semantic data store 302 may involve mapping all data from the data source or using a filter to only map some data from the data source. For instance, the data source may include data that is not pertinent to the purposes for which the business ontology 304 is used and, as a result, only pertinent data would be mapped to the semantic data store. A filter may be used to control which data is mapped to the semantic data store. For example, the data mappings above can be used in connection with Oracle Data Integration (ODI) Tools available from Oracle International Corporation in order to perform ETL processes that constrain and filter data from the various data stores and merge the data into a common format in the semantic data store 302. As described below, once maps are constructed, the maps can be used in automated processes that extract data from one data store and appropriately load the data into the semantic data store 302. Extraction and loading of data can occur, for example, at predetermined intervals such as once a day, or at predetermined triggers, such as when data is changed.

As shown in the example, data from the first relational database 306 is stored in the semantic data store 302 as well as data from the second relational database 310, the LDAP Directory 314, and the flat file database 318. In an embodiment, schemas of various data stores are mapped to the business ontology such that semantic concepts embodied in the data stores are stored in the business ontology 304. For example, the first relational database 306 may include a plurality of tables, each table having one or more columns. The first relational schema 308 may relate tables together in a useful manner, for example, relating customers to invoices such that a customer is related to an invoice for goods or services purchased by the customer. Thus, relationships defined by the relational schema 308 are mapped to the business ontology 304 such that semantic concepts defined by the relational schema 308 are preserved in the business ontology 304.

Figure 4:
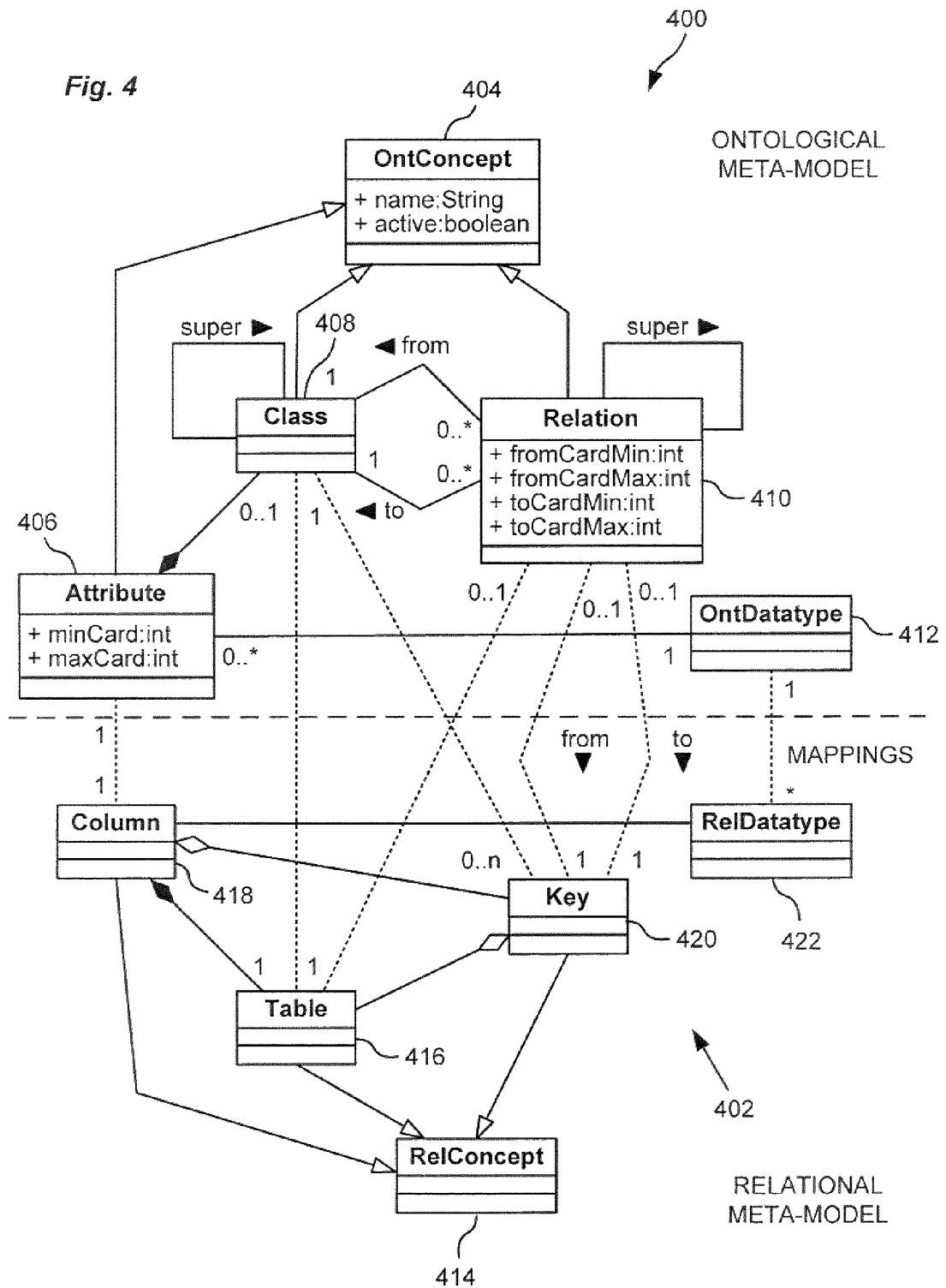
FIG. 4 shows a diagrammatic representation of mappings between ontological and relational meta-models that may be used with the architecture of FIG. 3, in accordance with an embodiment.

FIG. 4 shows an ontological meta-model 400 which, in an embodiment, provides an implementation for the architecture described in connection with FIG. 3 and to which a relational meta-model 402 is mapped. The example given in FIG. 4 may be useful, for example, for mapping data from a relational database to the ontological meta-model 400 although it will be understood by those with ordinary skill in the art that various data stores and corresponding data schemas may have different properties than what is shown. In an embodiment, the ontological meta-model 400 comprises a plurality of ontological storage containers which includes a container for ontological concepts 404, which is a super class of attributes 406 class, classes 408 class, and relations 410 class. In other words, attributes 406, classes 408, and relations 410 are all types of ontological concepts. In an embodiment, each class 408 is a collection of one or more entities or instances, such as employees, and each attribute 406 is a collection of one or more data-type property of a class, such as a first name. As noted above, the classes can have super classes. For example a member of an Employee class may be a member of a Manager class as well.

Also, in an embodiment, each relation 410 is a binary relationship between two classes. For example, a relation orgHasEmployees may be a relationship between a member of an organization class and an employee class. This relationship, for example, may specify employees that are part of an organization. Relations 410 may be further classified in terms of their domains (the class or classes from which they relate) and ranges (the class or classes to which they relate). Also, in an embodiment, some relations 410 have super relations. For instance orgHasEmployees may be a super relation of an orgHasManagers relation because, for example, all managers may be employees.

As shown in the diagram, the ontological meta model 400 also includes storage for ontological data types 412, which may be, for example, strings, integers, floats, dates, Boolean, or other types of data. In an embodiment, datatypes are the ranges (value sets) of the attributes and consist of sets of similar data forms. In the embodiment presented in the drawings, ontological type data is stored separately from instance data, which is stored in a hyper-denormalized relationed form. As used herein, semantic data that is in hyper-denormalized relationed form is stored such that every attribute is stored in its own table. This form provides an advantage in that instance data is easily and quickly accessible, which in turn allows for a highly distributed approach to solve problems of inferencing, persistence, and other issues. In other words, the architecture in the disclosed embodiment provides the power and flexibility of ontological storage with the performance of modern relational database management system. However, one with skill in the art will appreciate that variations are possible and that, in other contexts, different architecture may be appropriate. For example, one with skill in the art would recognize that type and instance data may be stored in the same storage system and that instance data need not be hyper-denormalized, but that different degrees of denormalization of data may be used, and different kinds of instance data may be combined in one or more containers.

As shown in the drawing, in an embodiment, between the classes are relations 410 between the classes 408 and there may be relations 410 among the relations 410. Also, each class 408 is an aggregation of attributes, in accordance with an embodiment.

As noted above, the relational meta-model 402 is mapped to the ontological meta-model, as described more fully below. In an embodiment, of relational meta-model includes relational concepts 414 which are super classes of tables 416, columns 418 and keys 420. Also, as is known, each table 416 is an aggregation of columns. As can be seen, various mappings are provided between various elements of the ontological meta-model 400 in relational meta-model 402. For instance, in an embodiment, one or more columns of a table are mapped to an attribute of the ontological meta-model 400. Likewise, tables 416 are mapped to classes 408 of the ontological meta-model 400. As keys 420 define relationships between tables 416 in the relational meta-model, keys of the relational meta-model 402 are mapped to relations of the ontological meta-model 410 in a manner preserving the relationships between the tables 416. In an embodiment, relational data types 422 are mapped to a ontological data types 412.

In an embodiment, the relational meta-model may be implemented using a relational database management system (RDBMS) and the meta-data in the relational meta-model is, therefore, readily available. The mapping shown in FIG. 4, in an embodiment, may also be achieved by utilizing Application Programming Interfaces (APIs) exposed by the systems implementing the relational meta-model 402, such as Java Database Connectivity (JDBC) meta-data, Open Database Connectivity (ODBC) meta-data, and the like.

Figure 5:
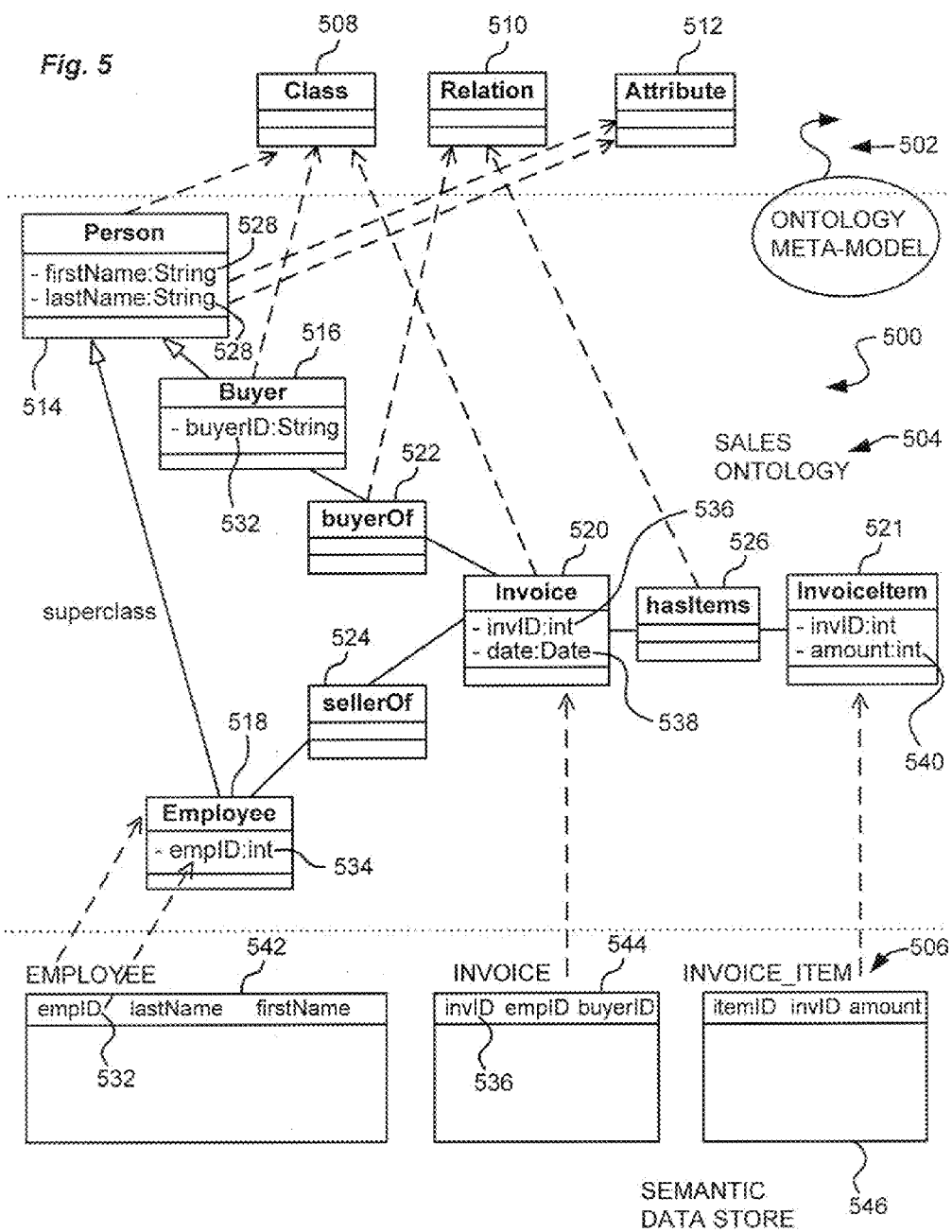
FIG. 5 shows an diagrammatic representation of a semantic data store and the relationships between the semantic data store, an ontology, and an ontological meta-model, where the semantic data store may be created using the mappings of FIG. 4.

FIG. 5 shows an example fragment 500 from a sales ontology data store that provides an illustrative example how an ontology meta model 502, sales ontology 504, and semantic data store 506 may relate, in accordance with an embodiment. In an embodiment, the semantic data store 506 is used to store and maintain the instance data that is modeled by one or more ontologies and that has been imported, filtered, and merged from the business data sources, such as those described above in connection with FIG. 3. In an embodiment, in order to reason over transactional data with high performance, the semantic data store 506 is formatted as a hyper-denormalized and vertically partitioned system. For example, data derived from n columns of an RDBMS table, in an embodiment, would be stored as n tables in the semantic data store 506.

In an embodiment, the semantic data store translates policies (queries) expressed in terms of the sales ontology 504 into queries expressed in terms of the semantic store schema, and executing the translated queries on the data store. The actual execution of the query may be delegated to a reasoner. Thus, in an embodiment, a query expressed in terms of classes and relations will be translated by the semantic data store 506 in terms of tables and keys. For example, in an embodiment, the ontological query:

ONT: SELECT X.firstName, X.lastName will get translated into the semantic data source query:

SELECT firstName, lastName FROM Partition_1, Partition_2, . . . , Partition_N.

In addition, appropriate relations may be substituted with foreign-key/primary-key pairings when the query is translated into the relational form.

As discussed above, the ontological meta-model is comprises of classes 508, relations 510 and attributes 512. The sales ontology 504 comprises specific instances of the members of the ontology meta-model 502. For example, as shown, the sales ontology 504 includes several classes including a person class 514, a buyer class 516 an employee class 518, an invoice class 520 and invoice item class 521. As seen by it's name, the person class 514 corresponds to people such as employees, buyers and other people. Accordingly, the buyer class 516 and employee class 518 are sub-classes of the person class 514. Also clear from its name, the invoice class 520 may be associated with invoices and the invoice item class 521 may be comprised of various invoice items such as various products sold by a business employing the disclosed ontology. In an embodiment, the employee class 518, invoice class 520, and invoice item class 521 have corresponding tables in the semantic data store 506. Other classes of the sales ontology 504 may also have corresponding tables in the semantic data store 506.

As shown, the sales ontology 504 includes various relations from the relations 510, such as a buyerOf relation 522 and a sellerOf relation 524 and a hasItems relation 526. The names of the various relations also may be related to their semantic meaning. For instance, as can be seen in the figure, a buyer of the buyer class 516 may be related to an invoice of the invoice class 520 by the relation buyerOf because the buyer may have purchased the particular items of the invoice. Likewise, an invoice of the invoice class 520 is related to invoice items of the invoice item class 521 by the relation hasItems 526 because the invoice items were included on the invoice. Also, the sellerOf relation 524 relates an employee of the employee class 518 to an invoice of the invoice class 520 when the employee was the person who sold the items listed on the invoice. In an embodiment, relations 510 are represented in the semantic data store 506 by the pairing of the primary key of the tables of the semantic data store 506, as discussed below.

Further, various items of the sales ontology 504 may include various members of the attribute class 512. As an example, person 514 may include a first name 528 and a last name 530, which as indicated in the drawing, may be stored as strings. Likewise, a buyer 516 may have a buyerID unique to the buyer as may an employee 518 have an employeeID 534 unique to the employee. Continuing this example, the invoice 520 may include an invoiceID 536 unique to the invoice 520 and a date 538, for example, on which the invoice 520 was created. As a final example, an invoice item of the invoiceItem class 521 may include an amount corresponding to the price at which the associated item was sold to the buyer 516.

As discussed above, various items of the sales ontology are stored in a semantic data store 506. In an embodiment, the semantic data store 506 may closely resemble a data store of another data model such as a relational database model. Thus, in an embodiment, the semantic data store 506 includes a plurality of tables where each table corresponds to a class of the ontology meta-model 502. It should be understood, however, that the example semantic data store 506 shown in the drawings may be in an intermediate format used to facilitate transformation of the data. Data from the semantic data store 506 may be further transformed, for example, into a format suitable for use with a particular reasoner operable to reason the data.

Thus, as shown in the illustrative example of FIG. 5, the semantic data store 506 includes an employee table 542, an invoice table 544 and an invoice item table 546. Each of the tables of the semantic data store 506 may include a key comprising an attribute unique to the entities represented by the table. For instance, the employee table 542 may include a column having each employee ID 532. Other attributes may also be stored in tables such as the last name and first name attributes of employees in the employee table 542. Likewise, the invoice table 544 may include a column corresponding to an invoice ID primary key, employee ID foreign key and buyer ID foreign key such that in this manner, for example, an ID of an invoice may be located in the invoice table 544 and the employee associated with the invoice and buyer to which items on the invoice are sold may be identified.

Figure 6B:
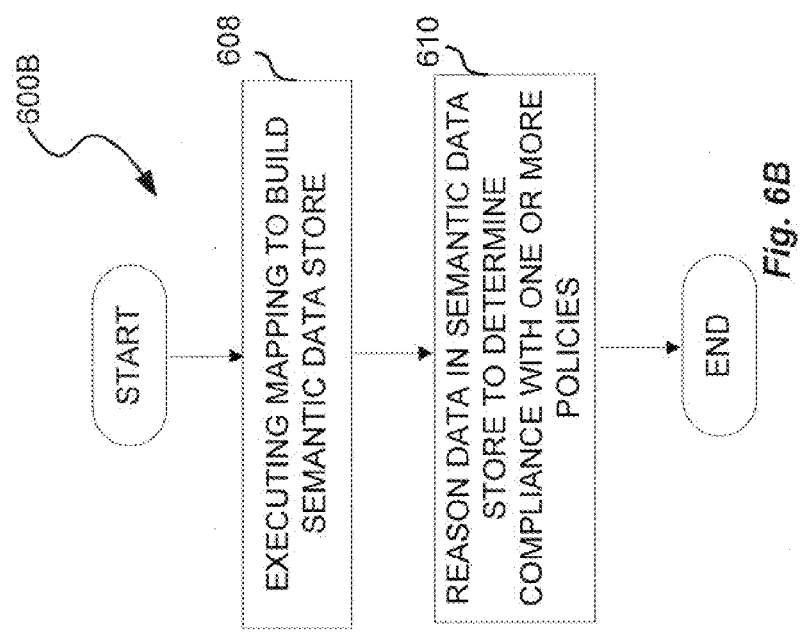
FIGS. 6A and 6B show a diagrammatic representation of a method of extracting data and creating a semantic data store, in accordance with an embodiment.
Figure 6A:
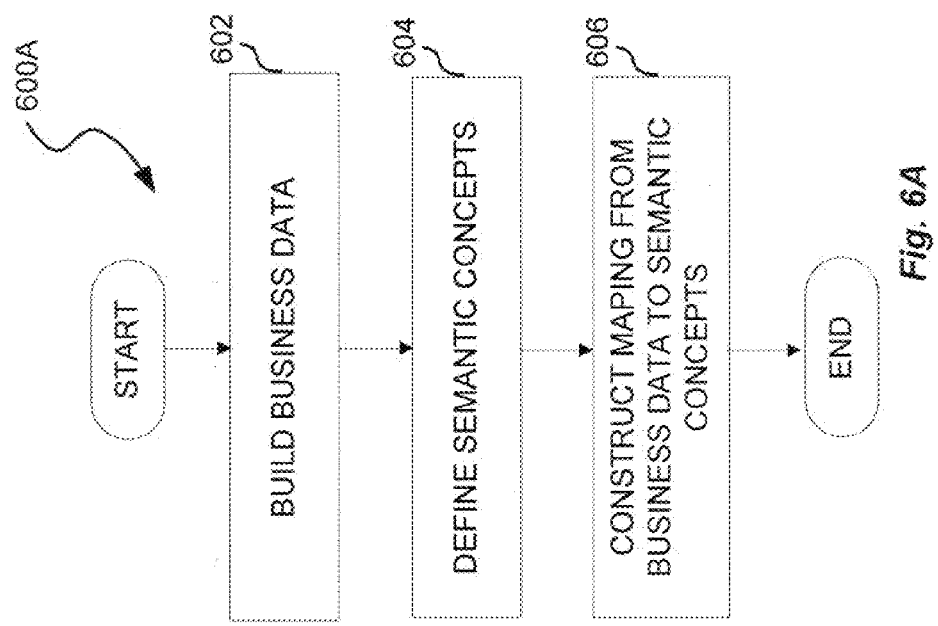

FIGS. 6A and 6B show a method for extracting a semantic data store, forming and reasoning an ontology in accordance with an embodiment. The method depicted in FIGS. 6A and 6B may be performed by hardware, software (e.g., code, program, instructions executed by a processor), or combinations thereof. For example, the method depicted in FIG. 6 may be implemented using instructions executed by one or more processors of various hardware components shown in FIG. 2. The software may be stored on a computer-readable storage medium.

FIG. 6A shows an initial map construction method 600A, in accordance with an embodiment. The method shown in FIG. 6A, or variations thereof, may be performed in order to prepare mappings used to load and update a semantic data store, as described below. The method shown in FIG. 6A may be performed at various times, and performance of the method may vary. For instance, a business may, over time, define policies that become increasingly complex and may employ reasoners using increasingly sophisticated algorithms, such as pattern recognition and other statistical analysis. The data desired for enforcement of the policies may require that different data sets be moved into a semantic data store, and the maps may be updated accordingly.

Turning to the method as shown in the drawings, as depicted in FIG. 6A, at a business data building step 602, business data is collected and stored. As discussed above, building business data may include using a variety of applications which store data in various formats, perhaps in various geographical locations. Business data building may be a process that proceeds over a period of time. For example, if a new employee joins an organization, a row in an employee table of a relational database may be added to correspond to the new employee. As another example, as new invoices are created, data related to the invoices are added to an appropriate data store.

At semantic definition step 604, semantic concepts are defined. For instance, if a business is interested in looking at an analyzing data relating to sales, semantic concepts such as employee, invoice item, buyer, seller etc., may be defined. Common semantic concepts may be pre-defined while less common concepts may be manually defined by users of a system employing an embodiment of the present invention.

At a map construction step 606, a data model map from the business data to the semantic concepts in a business ontology is defined. Because businesses may have a plurality of data stores storing data in various formats, constructing such a mapping may require specific knowledge of the specific data stores. However, predefined mappings may be included for data stores and data schemas which are commonly used, such as data stores that are included in database packages that are already configured for use by businesses that do not require a high level of customization.

FIG. 6B shows a method 600B for maintaining a semantic data store and executing policies, in accordance with an embodiment. The method 600B may be performed as part of the method 600A, or a variation thereof. In an embodiment, the method 600B is performed after the method 600A has been performed at least once. The method in 600B may be executed periodically to update a semantic data store and determine compliance with one or more policies. In addition, the various steps.

Turning to the specific steps of the method 600B, at a mapping execution step 608, the mapping from the business data to the semantic concepts is executed in order to build a semantic data store. As discussed above, constructing a map may include use of Oracle Data Integration (ODI) Tools available from Oracle Corporation in order to execute the mapping by performing ETL processes that constrain and filter data from the various data stores and merge the data into a common format in a semantic data store according to one or more maps created from the various data stores to the semantic data store. Also, as noted above, in an embodiment, building a semantic data store includes formation of and/or modification of one or more hyper-denormalized tables used to store the semantic data.

In an embodiment, as discussed above, as part of the mapping execution step 608, the user of one or more filters may be employed in order to limit the amount of information from business data sources that is loaded into the semantic data store. In an embodiment, every class of the ontology for the semantic data store has an active metadata property which has Boolean values. A filter may utilize the active metadata property in order to avoid performing ETL operations involving a class, relation, or attribute having an active metadata property that is set to "false." Filters may be employed using additional and/or alternative methods as well. For instance, the set of queries that will be allowed on a data store may be fixed and all concepts not involved with the queries may be set to be inactive (for instance, by setting the active metadata properties for the concepts to "false"). In this manner, an ETL process would only retrieve concepts mentioned in the queries and/or their sub-queries.

In terms of loading (priming) the semantic data store, as part of the mapping execution step 608 the business ontology (such as the sales ontology described above) and data model mappings may be bootstrapped initially which, in an embodiment, involves interrogation of the meta-data store of the data source (such as a RDBMS). For example, in the case of RDBMS source data, bootstrapping may be initiated through a one-time process that generates the business ontology and mappings from the RDBMS schema(s).

In certain instances, such as with source data from RDBMSs, Web Ontology Language (OWL) concepts are generated from corresponding relational concepts using a set of transformation rules in order to define the mappings from the source data to the semantic data store. For example, binary tables from a RDBMS may be transformed to relations in an ontology as may primary/foreign-key pairings. Other tables may be transformed to classes while columns of tables may be transformed to attributes.

In addition, because tables in a semantic data store have a similar structure to tables in many business data sources, it is often straightforward to dynamically create transformations to be executed by an ETL process in order to prime the semantic data store by moving data from the data sources to the data store. For example, this can be performed using ODI by Oracle Corporation for ETL from business data sources to a semantic data store. Generally, at system startup, when the semantic data store is empty, the records from the data sources (such as tables of an RDBMS) may be extracted, necessary data transformations may be made and then the data may be loaded into the semantic data store.

In addition, the business ontology and data model mappings may be manually edited and/or annotated to give domain-appropriate names to the business domain concepts and to capture any semantics that count's be captured automatically during bootstrapping. As an example, if the business ontology were intended to support an accounts payable business domain, the concepts of Invoice, Receipt, and Vendor might be defined. Further, if multiple overlapping data schemas are involved, the manual editing/annotation may involve merging of the concepts in the ontology. As an example, if bootstrapping resulted in a Buyer class and a Purchaser class because of different naming conventions in different data sources, these classes may be joined in the ontology to a single class.

As discussed above, as source data changes over time, the data in the semantic data store is updated at various times, such as periodically, by performing the mapping execution step 608 in order to update the semantic data store to reflect the changed data. Thus, the business ontology and data model mappings are used to define ETL transformations that may be scheduled to run automatically, such as at predefined periods of time, whenever there is a change in source data, and/or at other triggers. The ETL transformations move data from the data sources to the Semantic Data Store according to the data model mappings.

For example, with source data from RDBMSs, when the semantic data store is empty, it is a straightforward process to extract records from the data sources to the semantic data store by extracting data from the data source tables, make necessary data transformations, and then load the data into the semantic data stores. After startup, when there are already data in the semantic data store, records flowing into the semantic data store may need to be merged with existing data in the semantic data store. This may be done, for instance, by using a primary key in the incoming source record to locate the equivalent target record and either adding the record to the appropriate table in the semantic data store or merging the record into the appropriate table of the semantic data store. If the semantic data store table for the incoming record has an identifiable primary key tied to multiple data values, then the incoming record may be added to a table rather than merged.

At a reasoning step 610, data from the semantic data store is reasoned in order to determine compliance with one or more policies. Reasoning the data from the semantic data store may be accomplished in a variety of ways. For instance, data from the semantic data store may be reasoned according to techniques described in co-pending U.S. patent application Ser. No. 12/576,176, entitled "Techniques for Processing Ontologies," mentioned above. Generally, any method of reasoning the data of the semantic data store may be used. As examples, any suitable transitive and/or pattern-based reasoner may be used depending on the specific policies for which compliance is monitored.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for enforcing policies, comprising: identifying a plurality of data stores;
storing a first set of data in a first data store of the plurality of data stores, the first set of data comprising structured data;
defining a plurality of semantic concepts for an ontology;
constructing a map from at least a portion of the first set of data to the semantic concepts;
defining a condition for a trigger, the condition comprising at least the portion of the first set of data being changed;
executing the map to transform at least the portion of the first set of data into a second set of data every time the condition for the trigger is fulfilled such that at least the portion of the first set of data is changed, wherein at least the first data store of the plurality of data stores comprises a relational database that comprises at least one table and wherein the executing includes denormalizing the at least one table;
storing the second set of data in a semantic data store according to the ontology, the second set of data being stored in the semantic data store in one or more hyper-denormalized tables, wherein storing data in the plurality of denormalized tables comprises storing each column of the data in a different table of the plurality of denormalized tables; and
reasoning the second set of data to determine compliance with one or more policies that are predefined through a user interface configured for at least policy customization based at least in part on at least a subset of the semantic concepts of the ontology, the reasoning comprising translating a first query representing a policy of the one or more policies into a second query, the first query being expressed in terms of the ontology, and the second query being expressed in terms of the semantic data store.

2. The method of claim 1, wherein executing the map includes reformatting at least the portion of the first set of data.

3. The method of claim 1, wherein executing the map comprises filtering at least the portion of the first set of data.

4. The method of claim 1, wherein constructing the map includes defining ETL transformations from at least the portion of the first set of data to the second set of data.

5. The method of claim 1, wherein executing the map further includes transforming the second set of data into another format.

6. At least one non-transitory computer readable storage medium, having stored thereon instructions for causing at least one processor to perform a method of enforcing policies, said instructions comprising:
instructions for identifying a plurality of data stores;
instructions for storing a first set of data in a first data store of the plurality of data stores, the first set of data comprising structured data;
instructions for defining a plurality of semantic concepts for an ontology;
instructions for constructing a map from at least a portion of the first set of data to the semantic concepts;
instructions for defining a condition for a trigger, the condition comprising at least the portion of the first set of data being changed;
instructions for executing the map to transform at least the portion of the first set of data into a second set of data every time the condition for the trigger is fulfilled such that at least the portion of the first set of data is changed, wherein at least the first data store of the plurality of data stores comprises a relational database that comprises at least one table and wherein the instructions for executing include instructions for denormalizing the at least one table;
instructions for storing the second set of data in a semantic data store according to the ontology, the second set of data being stored in the semantic data store in one or more hyper-denormalized tables, wherein storing data in the plurality of denormalized tables comprises storing each column of the data in a different table of the plurality of denormalized tables; and
instructions for reasoning the second set of data to determine compliance with one or more policies that are predefined through a user interface configured for at least policy customization based at least in part on at least a subset of the semantic concepts for the ontology, the instructions for reasoning comprising instructions for translating a first query representing a policy of the one or more policies into a second query, the first query being expressed in terms of the ontology, and the second query being expressed in terms of the semantic data store.

7. The at least one computer readable storage medium of claim 6, wherein the instructions for executing the map include instructions for reformatting at least the portion of the first set of data.

8. The at least one computer readable storage medium of claim 6, wherein the instructions for executing the map comprise instructions for filtering at least a portion of the first set of data.

9. The at least one computer readable storage medium of claim 6, wherein the instructions for constructing the map include instructions for defining ETL transformations from at least the portion of the first set of data to the second set of data.

10. The at least one computer readable storage medium of claim 6, wherein the instructions for executing further includes instructions for transforming the second set of data into another format.

11. A system for enforcing policies, comprising:
a plurality of data stores including at least one first data store operable to store a first set of data, the first set of data comprising structured data;
a processor operable to:
identify the plurality of data stores;
define a condition for a trigger, the condition comprising at least a portion of the first set of data being changed; and
extract a second set of data from the first set of data according to a map between the first set of data and a set of semantic concepts of an ontology every time the condition for the trigger is fulfilled such that the portion of the first set of data is changed,
wherein the at least the first data store of the plurality of data stores comprises a relational database that comprises at least one table and wherein the processor is operable to denormalize the at least one table;
a semantic data store communicatively coupled to the processor and operable to receive the second set of data according to the ontology, the second set of data being stored in the semantic data store in one or more hyper-denormalized tables, wherein storing data in the plurality of denormalized tables comprises storing each column of the data in a different table of the plurality of denormalized tables; and a rules engine communicatively coupled to the second data store, the rules engine operable to reason the second set of data to determine compliance with one or more policies that are predefined through a user interface configured for at least policy customization based at least in part on at least a subset of the semantic concepts for the ontology, the reasoning by the rules engine comprising translating a first query representing a policy of the one or more policies into a second query, the first query being expressed in terms of the ontology, and the second query being expressed in terms of the semantic data store.

12. The system of claim 11, wherein the processor is operable to reformat at least the portion of the first set of data.

13. The system of claim 11, wherein the processor is operable to filter at least the portion of the first set of data.

14. The system of claim 11, wherein the map includes a set of ETL transformations from at least the portion of the first set of data to the second set of data.

15. The method of claim 11, wherein the processor is further operable to transform the second set of data into another format.

16. The method of claim 1, wherein the first query is expressed in terms of a class of the ontology and relational data of the ontology and the second query is expressed in terms of a table of the semantic data source and a key of the semantic data source.

17. The method of claim 1, wherein the translating translates a class of the ontology into a table of the semantic data source and wherein the translating translates relational data of the ontology into a key of the semantic data store.

18. The method of claim 1, wherein storing the data in the plurality of denormalized tables further comprises storing at least a first attribute of the data in a separate denormalized table from at least a second attribute of the second set of data.

* * * * *

UNITED STATES PATENT AND TRADEMARK OFFICE
CERTIFICATE OF CORRECTION

PATENT NO.        : 9,569,725 B2                                    Page 1 of 1
APPLICATION NO.   : 12/581804
DATED             : February 14, 2017
INVENTOR(S)       : B'Far et al.

It is certified that error appears in the above-identified patent and that said Letters Patent is hereby corrected as shown below:

In the Specification

In Column 3, Line 32, delete "at lest" and insert -- at least --, therefor.

In the Claims

In Column 18, Line 4, in Claim 15 delete "method" and insert -- system --, therefor.

Signed and Sealed this
Eighth Day of May, 2018

Andrei Iancu
*Director of the United States Patent and Trademark Office*